US006713550B2

(12) United States Patent
Schliesman et al.

(10) Patent No.: US 6,713,550 B2
(45) Date of Patent: Mar. 30, 2004

(54) METHOD FOR MAKING A HIGH SOLIDS INTERACTIVE COATING COMPOSITION AND INK JET RECORDING MEDIUM

(75) Inventors: Leonard J. Schliesman, Wisconsin Rapids, WI (US); Leland O. Tritz, Wisconsin Rapids, WI (US); Karen K. Spreda, Plover, WI (US)

(73) Assignee: Stora Enso North America Corporation, Wisconsin Rapids, WI (US)

( * ) Notice: Subject to any disclaimer, the term of this patent is extended or adjusted under 35 U.S.C. 154(b) by 119 days.

(21) Appl. No.: 09/941,279

(22) Filed: Aug. 27, 2001

(65) Prior Publication Data

US 2002/0055552 A1 May 9, 2002

Related U.S. Application Data

(63) Continuation-in-part of application No. 09/642,726, filed on Aug. 21, 2000, now abandoned, which is a division of application No. 09/097,016, filed on Jun. 12, 1998, now Pat. No. 6,140,406, which is a continuation-in-part of application No. 08/672,649, filed on Jun. 28, 1996, now abandoned, and a continuation-in-part of application No. 08/874,166, filed on Jun. 13, 1997, now Pat. No. 6,129,785.

(51) Int. Cl.[7] ............................ C08K 3/36; C08L 29/04
(52) U.S. Cl. ........................ 524/492; 524/503; 106/483
(58) Field of Search ................................. 524/492, 493, 524/430, 437, 503; 106/481, 482, 483, 491, 494

(56) References Cited

U.S. PATENT DOCUMENTS 3,298,030 A 1/1967 Lewis et al.
3,415,671 A 12/1968 Rice
3,523,818 A 8/1970 Blumenthal
3,535,202 A 10/1970 Huang
3,615,549 A 10/1971 Ohyama et al.
3,655,527 A 4/1972 Curran et al.
3,715,219 A 2/1973 Kurz et al.
3,759,744 A 9/1973 Schliesman
3,889,270 A 6/1975 Hoffmann et al.
3,966,572 A 6/1976 Carder
4,102,845 A 7/1978 Schroder et al.
4,151,666 A 5/1979 Raphael et al.
4,168,165 A 9/1979 Kato et al.
4,168,338 A 9/1979 Kato et al.
4,266,016 A 5/1981 Date et al.
4,330,605 A 5/1982 Boston
4,371,582 A 2/1983 Sugiyama et al.
4,425,405 A 1/1984 Murakami et al.
4,440,827 A 4/1984 Miyamoto et al.
4,446,174 A 5/1984 Maekawa et al.
4,460,637 A 7/1984 Miyamoto et al.
4,474,847 A 10/1984 Schroder et al.
4,474,850 A 10/1984 Burwasser
4,474,859 A 10/1984 Oshima et al.
4,478,910 A 10/1984 Oshima et al.
4,490,434 A 12/1984 Oshima et al.
4,542,059 A 9/1985 Toganoh et al.
4,554,181 A 11/1985 Cousin et al.
4,564,560 A 1/1986 Tani et al.
4,576,867 A 3/1986 Miyamoto
4,620,197 A 10/1986 Miyamoto et al.
4,636,409 A 1/1987 Arai et al.
4,642,654 A 2/1987 Toganoh et al.
4,732,786 A 3/1988 Patterson et al.
4,743,507 A 5/1988 Franses et al.
4,758,461 A 7/1988 Akiya et al.
4,780,356 A 10/1988 Otouma et al.
4,792,487 A 12/1988 Schubring et al.
4,877,678 A 10/1989 Hasegawa et al.
4,877,686 A 10/1989 Riou et al.
4,879,166 A 11/1989 Misuda et al.
4,892,787 A 1/1990 Kruse et al.
4,900,620 A 2/1990 Tokita et al.
4,902,568 A 2/1990 Morohoshi
4,915,923 A 4/1990 Ogawa et al.
4,931,810 A 6/1990 Iwata et al.
5,013,603 A 5/1991 Ogawa et al.
5,041,328 A 8/1991 Akiya et al.
5,057,570 A 10/1991 Miller et al.
5,081,470 A 1/1992 Kurabayashi et al.
5,124,201 A 6/1992 Kurabayashi et al.
5,180,624 A 1/1993 Kojima et al.
5,213,873 A 5/1993 Yasuda et al.
5,266,397 A 11/1993 Ogawa et al.
5,270,103 A 12/1993 Oliver et al.

(List continued on next page.)

FOREIGN PATENT DOCUMENTS

DE 3151471 8/1982
EP 439153 A 7/1991
EP 493100 A1 7/1992

(List continued on next page.)

OTHER PUBLICATIONS

Ralph K. Iler, *Silica Gels and Powders,* "The Chemistry of Silica Solubility, Polymerization, Colloid and Surface Properties, and Biochemistry," Ed. John Wiley & Sons; 5 (462–621) 1979.

(List continued on next page.)

*Primary Examiner*—Callie Shosho
(74) *Attorney, Agent, or Firm*—Greer, Burns & Crain, Ltd

(57) ABSTRACT

A coating composition for an ink jet recording medium comprises an aqueous suspension of binder, a cationic fixing agent, an absorptive pigment, and a sizing agent. The coating composition combines solids content of greater than 30% with good runnability. The composition may preferably be dispersed at pH values in the range of 4.5 to 7.0. The pigment is preferably a mixture of 50% or more silica gel having a pore volume of 0.5–2.0 cc/g, and 10% or more alumina or alumina hydrate. A method for making down a composition has sequential steps of dispersing a binder in water, adding a cationic fixing agent, dispersing an alumina and an absorptive silica, adding a fluorescent whitening agent, cooling the composition, and finally adding a sizing agent.

27 Claims, No Drawings

U.S. PATENT DOCUMENTS

| | | | | | |
|---|---|---|---|---|---|
| 5,279,885 | A | | 1/1994 | Ohmori et al. | |
| 5,302,437 | A | | 4/1994 | Idei et al. | |
| 5,314,747 | A | | 5/1994 | Malhotra et al. | |
| 5,320,897 | A | | 6/1994 | Kondo et al. | |
| 5,397,619 | A | | 3/1995 | Kuroyama et al. | |
| 5,437,925 | A | | 8/1995 | Macaulay et al. | |
| 5,459,502 | A | | 10/1995 | Sakaki et al. | |
| 5,463,178 | A | | 10/1995 | Suzuki et al. | |
| 5,472,757 | A | | 12/1995 | Ogawa et al. | |
| 5,478,631 | A | | 12/1995 | Kawano et al. | |
| 5,605,750 | A | | 2/1997 | Romano et al. | |
| 5,660,622 | A | | 8/1997 | Nikoloff | |
| 5,660,928 | A | | 8/1997 | Stokes et al. | |
| 5,700,582 | A | | 12/1997 | Sargeant et al. | |
| 5,702,804 | A | | 12/1997 | Malhotra | |
| 5,709,976 | A | | 1/1998 | Malhotra | |
| 5,725,946 | A | | 3/1998 | Fukushima et al. | |
| 5,747,146 | A | | 5/1998 | Kashiwazaki et al. | |
| 5,755,929 | A | | 5/1998 | Kuroyama et al. | |
| 5,766,398 | A | * | 6/1998 | Cahill et al. | 156/240 |
| 5,798,173 | A | | 8/1998 | Momma et al. | |
| 5,846,647 | A | | 12/1998 | Yoshino et al. | |
| 5,851,654 | A | | 12/1998 | Yoshino et al. | |
| 5,856,001 | A | | 1/1999 | Okumura et al. | |
| 5,856,023 | A | | 1/1999 | Chen et al. | |
| 5,863,648 | A | | 1/1999 | Ohmura et al. | |
| 5,866,268 | A | | 2/1999 | Sargeant et al. | |
| 5,869,177 | A | | 2/1999 | Yoshino et al. | |
| 5,882,388 | A | | 3/1999 | Adair et al. | |
| 5,882,396 | A | | 3/1999 | Hiorns | |
| 5,882,754 | A | | 3/1999 | Kuroyama et al. | |
| 5,882,755 | A | | 3/1999 | Igarashi et al. | |
| 5,888,635 | A | | 3/1999 | Yang et al. | |
| 5,897,961 | A | | 4/1999 | Malhotra et al. | |
| 5,916,673 | A | | 6/1999 | Fryberg et al. | |
| 5,928,765 | A | | 7/1999 | Malhotra | |
| 5,928,787 | A | | 7/1999 | Owatari et al. | |
| 5,928,988 | A | | 7/1999 | Yamane et al. | |
| 5,942,335 | A | | 8/1999 | Chen et al. | |
| 5,962,128 | A | | 10/1999 | Kuroyama | |
| 5,965,244 | A | | 10/1999 | Tang et al. | |
| 5,985,424 | A | | 11/1999 | DeMatte et al. | |
| 6,010,790 | A | | 1/2000 | Chen et al. | |
| 6,028,028 | A | | 2/2000 | Nitta | |
| 6,037,050 | A | | 3/2000 | Saito et al. | |
| 6,074,793 | A | | 6/2000 | Camp et al. | |
| 6,165,606 | A | | 12/2000 | Kasahara et al. | |
| 6,214,449 | B1 | * | 4/2001 | Otani et al. | 428/218 |

FOREIGN PATENT DOCUMENTS

| | | | |
|---|---|---|---|
| EP | 00730976 | | 9/1996 |
| EP | 743193 | A1 | 11/1996 |
| EP | 803374 | A2 | 10/1997 |
| EP | 968836 | A2 | 1/2000 |
| EP | 1002657 | A1 | 5/2000 |
| EP | 888904 | B1 | 3/2001 |
| GB | 2129333 | B | 11/1986 |
| GB | 2334684 | A | 9/1999 |
| JP | 51-47340 | | 12/1976 |
| JP | 52-74340 | | 3/1977 |
| JP | 55-051583 | | 4/1980 |
| JP | 56-148583 | | 11/1981 |
| JP | 56-148586 | | 11/1981 |
| JP | 56-082085 | | 5/1982 |
| JP | 57-107878 | | 7/1982 |
| JP | 57-107879 | | 7/1982 |
| JP | 57-157786 | | 9/1982 |
| JP | 58-094491 | | 6/1983 |
| JP | 1160674 | | 6/1989 |
| JP | 8072387 | | 3/1996 |
| JP | 09272257 | | 10/1997 |
| WO | WO 95/00340 | | 1/1995 |

OTHER PUBLICATIONS

*Technical Bulletin No. 105,* "Stickies and Pitch Pacification White Paper Grades; Kenite•; Celite•; Harborlite•." Ed. World Minerals Inc.; 1980.

*Hercules*. "Hercon 70, 72, 75, and 78 Cationic Emulsions, The Next Generation of Alkaline Sizing Agents." Ed. Hercules, Inc; Dec. 1989.

Masao Takahashi, Teiji Sato and Masahide Ogawa; Research and Development Division "*Development of Amorphous Silica for Ink Jet Recording Paper.*" Ed Mizusawa Industrial Chemicals, Ltd.; Apr. 23, 1990.

*Paper Chemicals Products & Services.* "Lectrapel Anti–Static Agent." Ed. Calgon Corporation, Water Management Division; Dec. 1992.

"Basoplast•335 D"; BASF Corporation; Jun. 1994.

*Hercules.* "Chromaset™ 600 Surface Sizing Treatment." Ed. Hercules, Inc.; Nov. 1994.

*Air Products and Chemicals.* "Airvol•Polyvinyl Alcohol Typical Properties." Ed. Air Products and Chemicals, Inc. 1995.

Martifin OL/107; May 1995.

"*Polyox•Water–Soluble Resins*". (1995).

Micahel C. Wilthiam. Silica Pigments for Ink Jet Printablility; Presented at the 1996 TAPPI Coating Conference, Nashville, TN, May 21, 1996.

"*Kirk–Othmer Encyclopedia of Chemical Technology,*" Recycling, Oil to Silicon. Ed.John Wiley & Sons; Fourth Edition; vol. 21. (Sep. 1992).

*CIBA–GEIGY Technical Bulletin.* "Fluorescent Whitening Agents for Paper." (1995).

*CIBA–Geigy Technical Bulletin.* "Tinopal HST Liquid." (1995).

*CIBA–GEIGY Technical Bulletin.* "Tinopal SCP Liquid." (1995).

Paper Chemicals. MSA–150 Surface Size. Ed. Morton• Water Based Polymers. (1995).

*Davison Silica Gels.* "Typical Chemical and Physical Properties of Silica Gel." (1995).

"*UniQ–Print• 8000 Unique Printability Enhancer*" Sequa Chemicals, Inc. Ed. Dequa Chemicals, Inc. (1995).

D.M. Chapman, Ph.D. "Silica–Gel Coatings for Ink–Jet Media." Ed. Grace Davison. (1995).

*"The Davison Family of Syloid•Silicas."* Ed. Grace Davison Chemical. (1995).

"Introduction to Silica Gel." (1995).

"*Acronal• PR 8689 X*" Ed. BASF Corporation. Aug. 1995.

* cited by examiner

METHOD FOR MAKING A HIGH SOLIDS INTERACTIVE COATING COMPOSITION AND INK JET RECORDING MEDIUM

CROSS REFERENCE

The present application is a continuation-in-part of co-pending application Ser. No. 09/642,726, filed Aug. 21, 2000, now abandoned, which is a division of Ser. No. 09/097,016, filed Jun. 12, 1998, now U.S. Pat. No. 6,140, 406, which is a continuation-in-part of application Ser. Nos. 08/672,649 filed Jun. 28, 1996, now abandoned, and Ser. No. 08/874,166, filed Jun. 13, 1997, now U.S. Pat. No. 6,129, 785.

BACKGROUND OF THE INVENTION

This invention relates to coating compositions and ink recording media, especially adapted for ink jet printing, and methods for making the coating composition and recording media.

Ink jet printers employ a plurality of jets connected to a supply of liquid based ink. The jets have small openings and can be energized to emit uniform liquid droplets of ink in a continuous stream upon demand. The jets are controlled to print characters or images on a moving flat surface, usually a sheet of paper.

In order to improve print quality and ink drying time, many proposals have been made for coatings on paper to improve ink reception. For example, it is well known that paper can be coated with various absorptive pigments, binders and sizing agents. An aqueous suspension of these agents is applied to a paper or other substrate using conventional coating methods.

An ideal ink receiving coating on paper will allow rapid absorption of the liquid component of the ink, which correlates to a rapid ink drying time, while preventing diffusion of the ink colors into the paper substrate. At the same time, the coating should cause the ink pigment or dye to be fixed on the sheet surface in the form of well-defined dots of uniform size and shape. A correct balance of these properties is very difficult to achieve, especially at higher printer resolutions and smaller dot diameters.

While a variety of acceptable coatings can be devised in theory, it is also imperative for the sake of economy that the coatings are capable of being applied uniformly to a base sheet at a high rate of speed using conventional coating equipment. Many of the known absorptive pigments, such as those based on powdered forms of silica, cannot be employed because an excessive amount of binder is required for processing at the solids content necessary to achieve the desired minimum coat weight. The suspensions become too thick or dilatant to allow pumping and uniform application using a conventional paper coater such as a blade coater. If lower binder levels are employed, this may also result in excessive "dusting" (defined infra) in the finished product.

An ideal ink jet recording medium requires a finished product with a smooth, uniform finish, free of defects. Scratches, streaks, and other defects are commonly caused by grit (particles greater than 40 microns in diameter) in the coating composition. Grit also causes undesirable wear on coating blades and other application equipment. Grit is formed in the coating composition due to agglomeration of pigment particles and other ingredients. The particles tend to agglomerate under various conditions, including the presence of agents that are reactive in some manner with the pigment or other coating ingredients, such as cationic fixing agents and sizing agents. However, the use of such agents is desirable for overall product quality.

Another condition that tends to increase the occurrence of agglomeration and, hence, grit is increasing solids concentration in the coating composition. In many prior art formulations, solids concentrations of above 15–25% were often not possible due to unacceptable levels of agglomeration.

In many commercial applications, however, a high solids concentration is needed to produce a finished coat weight of about 7–13 gm/m$^2$ (5–8 lbs/3300 ft$^2$). Coat weights of this magnitude are difficult, and may even be impossible, to achieve using low solids content (15% –25%) coating compositions with standard coating application equipment.

Low solids concentration coatings also have correspondingly high water contents, resulting in relatively large energy requirements for drying.

For the foregoing reasons, an unfulfilled industry need exists for a high solids, i.e. 30% or greater, coating composition which remains relatively free from grit and which may be applied using standard coating equipment.

OBJECTS OF THE INVENTION

It is an object of the invention to provide a method for making a coating composition and a recording medium adapted for ink jet printing that will rapidly absorb the liquid component of the ink, thereby providing rapid ink drying time.

It is an additional object of the invention to provide a method for making an ink jet coating composition and recording medium that is interactive with ink jet dyes to fix the ink on the surface of the sheet without objectionable dye penetration or "bleeding" (erratic migration in the X-Y plane).

It is a further object of the invention to provide a method for making an ink jet coating composition that has a high solids content, is substantially free of grit, and which may be readily applied to a base sheet with conventional coating equipment.

A final object of the invention is to provide a sequential make down process whereby reactive agents may be added to the composition under conditions that prevent or minimize undesirable reactions with other agents and grit formation.

SUMMARY OF THE INVENTION

An ink receptive coating is applied to one or both sides of a substrate. The substrate may be optionally precoated with a size solution before the ink receptive coating is applied. The ink receptive coating generally is comprised of a binder, a cationic fixing agent, an absorptive pigment, and a sizing agent. The coating contains a high concentration of solids, above 30% and most preferably in the range 35–38%, and is capable of being uniformly applied using standard blade type coating equipment. The ink jet recording medium of the invention provides superior ink jet printing quality. The invention further comprises methods for making the coating formulation of the invention.

A preferred embodiment of a method of the invention begins with the dispersion of a suitable binder in water. Preferably the binder should not only provide strength in the applied coating, but also function as a protective colloid in the coating makedown process. As a protective colloid, it prevents interaction of the various coating ingredients, and thereby allows the coating formulation of the invention to achieve high solids concentrations with substantially no grit.

Although several suitable binders could be used, low molecular weight, partially hydrolyzed polyvinyl alcohol is preferred. A preferred dispersion process consists of dispersing the polyvinyl alcohol in water at 15% solids, heating the dispersion to 95° C., holding at that temperature (for at least approximately 30 minutes) until the polyvinyl alcohol has substantially dispersed, and then cooling the dispersion.

Preferably, a cationic fixing agent is then added to the binder/water dispersion. A cationic charge is desirable in the coating composition to charge the pigment. Cationically charged pigments hold more dye at their surfaces than pigments with anionic charges. A preferred cationic fixing agent is polycationic quaternary ammonium polymer.

Preferably an absorptive pigment, or pigments, is/are then added to the binder/water/fixing agent dispersion. Preferred pigments are comprised of dry powders. The previously added cationic fixing agent acts as a dispersing aid, with the result that no dispersing agent is needed for combination with the pigment. The preferred pigment is an absorptive silica dispersed at a low pH, with silica gels being preferred. Coating compositions having a pH value of 4.0–7.5 have been found to give improved ink holdout over conventional coating compositions having pH values in the range of 8.0–9.0. The improved ink holdout results in better color saturation, reduced bleed through to the backside, less dark fade (defined infra), and better overall print quality. As will be appreciated by those knowledgeable in the art, silica gels with low pH values and high void volumes desirable for ink absorption are commercially available.

An alternate absorptive pigment is calcined diatomaceous earth. Coating compositions with diatomaceous earth pigments can be made with high solids concentrations, i.e. greater than 30%, and with good inkjet printing qualities. Although diatomaceous earth has good ink solvent absorptive properties, its use results in a coating composition having a pH value that is greater than 7. In addition, recording media with a high concentration of diatomaceous earth have been found to be undesirably abrasive.

Additional pigments may be added for purposes of improving coating composition whiteness and/or rheology. Desirably, these pigments remain stable at low pH. Alumina pigments are one type of pigment that have both high whiteness and are stable at low pH. Also, alumina pigments have been found to improve rheology. A fluorescent whitening agent may be added as well to improve sheet whiteness.

The coating composition of the invention also preferably includes a sizing agent. A preferred sizing agent is a styrene acrylic dispersion. In preferred formulations, styrene acrylic sizing agents have been found to substantially prevent spreading of ink jet ink droplets in the horizontal plane of the paper without significantly hindering vertical penetration into the coating. These effects promote the formation of desirably round printed ink jet dots, as contrasted with undesirable oval, star, or otherwise irregularly shaped dots. Further, by not hindering vertical ink penetration into the substrate, styrene acrylic sizing agents further achieve advantages in rapid ink drying time.

In the preferred method of the invention, the order of addition of materials is important with regards to the binder, the cationic fixing agent, the pigments, and the sizing agent. Although various orders of addition may be used, the most preferred order of addition substantially avoids particle agglomeration. In particular, the cationic and sizing agents are interactive. If improperly combined, they can agglomerate and cause formation of grit and rheology problems. It has been discovered that if the cationic fixing agent is added to the polyvinyl alcohol (or at least a portion thereof) in the initial stage of the coating makedown, prior to the introduction of the sizing agent, compatibility problems are substantially avoided. Further, if the sizing agent is added sequentially at the end of the makedown process, ink jet ink dry times are dramatically reduced and coating composition stability is improved. The polyvinyl alcohol binder can be thought of as protecting the cationic fixing agent from reaction with the sizing agent.

It is possible to practice the invention using other orders of addition. It is possible, for example, to add the sizing agent early in the makedown process. For example, the sizing agent may be mixed with the binder dispersion before addition of the cationic fixing agent. It has been discovered, however, that adding the sizing agent last greatly improves ink jet ink dry times and coating stability. Accordingly, the most preferred sequential order of addition is 1) binder, 2) cationic fixing agent, 3) pigment, and 4) sizing agent.

The coating composition should preferably be cooled to a temperature of 49° C. (120° F.) or lower, and more preferably at or below 40° C. (105° F.), before addition of the sizing agent to further ensure good stability and rheology qualities. It has been discovered that these temperatures inhibit reaction between the sizing agent and other components, thereby preventing precipitation out of solution of one or more of these materials.

A coating composition of the invention generally comprises, by bone dry weight parts:

| | |
|---|---|
| 10–50 | parts binder |
| 2–20 | parts cationic fixing agent |
| 100 | parts pigment, at least 50% of which is an absorptive silica pigment |
| 1–10 | parts sizing agent |

A preferred coating composition embodiment has a pH value of 4.0 to 7.5, a solids content of at least 30%, and comprises, approximately, in bone dry parts by weight:

| | |
|---|---|
| 40 | parts low molecular weight, partially hydrolyzed polyvinyl alcohol |
| 10 | parts polycationic quaternary ammonium polymer |
| 25 | parts alumina trihydrate |
| 75 | parts silica gel |
| 2 | parts whitening agent |
| 5–8 | parts styrene acrylic sizing agent |

The coating of the present invention thus provides a high solids composition that maybe uniformly applied to a substrate with conventional coaters. The coated ink jet medium of the present invention allows ink jet printing over a wide range of resolution (300 to 1400 dpi) with precise control of dot size, dot uniformity (freedom from print mottle), dot shape, and rapid ink dry time. The ink jet media of the invention offers superior resistance to water. Printed sheets will not generally run or distort when splashed with water. This is a distinct advantage over conventional ink jet recording media.

Further objects and advantages of the invention will become apparent from the following detailed description of preferred embodiments.

DESCRIPTION OF PREFERRED EMBODIMENTS

The coating composition of the invention preferably comprises an aqueous suspension of binder, a cationic quarternary ammonium fixing agent, an absorptive pigment, and a styrene acrylic sizing agent. The formulation of the coating as well as the method of preparation provide a high solids content in addition to freedom from agglomeration and rheology problems, and therefore results in excellent runnability.

The coating composition of the invention is applied to a substrate, for example, paper. When an inkjet ink is applied to the coated paper, the absorptive pigment particles absorb the ink solvent (primarily water) leaving the dyes on the surface of the particles. The cationic agent assists in fixing the dye on the surface. This results in rapid ink dry time and improved ink hold out and color density.

A preferred embodiment of the coating formulation invention has a pH value of between about 4.5 and 7, and most preferably between 4.5 and 5.5. Although the precise technical effect is not fully known, it is believed that the acidic pH of the coating composition enhances the cationic function. Coatings at these preferred pH values have been found to have improved holdout of the inkjet ink dyes on the paper surface as compared to conventional alkaline coating compositions having pH values of 8.0 to 9.0. The improved holdout results in enhanced color saturation and better overall print quality. It also reduces dye penetration to the opposite side of the sheet and improves dark fade (fade that occurs when printed material is not exposed to light).

Tests have been conducted on coating formulations of varying pH values. Coating compositions were prepared in accordance with the invention using pigments and binders selected to result in low pH values. In additional samples, acid was added to further lower pH values. In still additional samples, a base (sodium hydroxide) was added to increase pH. It was found that when the pH ofthe composition is reduced to a value below about 4.0 the composition becomes unstable—the ingredients become less compatible and viscosity increases with time. As the pH is increased above about 5.5, to beyond a pH value of 7.5, the dispersion becomes similarly unstable, the viscosity of the composition becoming undesirably high. Accordingly, it has been found that a pH value in the range of about 4.5 to about 5.5 is most preferable.

Polyvinyl alcohol (PVOH) is a preferred binder for the coating formulation of the invention. It is noted that as used herein the term "binder" is intended to refer to a material having a primary function of cohesion of the dried coating composition and adhesion of the coating composition to the substrate. Starches and latexes are also suitable binders and could provide satisfactory cohesion and adhesion strength. Most latex binders are incompatible with cationic fixing agents, however. Accordingly, if a cationic fixing agent is used, one must select a compatible latex. Also, many starches have lower binding strength than PVOH and would require excessive levels of use. Additional binders that may be useful in the practice of some embodiments of the invention are polyvinyl pyrrolidone; celluloses and modified celluloses, such as carboxy methyl cellulose, methyl cellulose, hydroxy ethylated cellulose, and the like; and polyvinyl acetates.

Suitable polyvinyl alcohol binders include low and medium molecular weight, partially and fully hydrolyzed polyvinyl alcohols. Fully hydrolyzed products tend to be too water insoluble, give long ink dry times, and result in unstable viscosities. Medium molecular weight products can cause excessive viscosities and poor rheology. Thus, the preferred polyvinyl alcohols are low molecular weight, partially hydrolyzed. One such product is Airvol 805 from Air Products and Chemicals, Inc., Allentown, Pa. The binder component of the coating composition of the invention may comprise a plurality of materials. As an example, a useful binder may comprise polyvinyl alcohol in combination with a starch.

Coating formulations of the invention further comprise a cationic fixing agent. It has been discovered that cationic pigments hold more dye at the surface than anionic pigments. Also, cationic fixing agents are more effective at low pH conditions than they are at alkaline pH values. The type of cationic fixing agent used is not critical as long as it is compatible with the other coating ingredients. The fixing agent must be effective at concentrating the dyes at the coated surface, provide satisfactory runnability on a blade coater (i.e., good rheology), and not adversely affect brightness.

Useful fixing agents that meet these criteria may be selected from the group including acrylamide acrylic polymers and their derivatives, polyamines and their derivatives, polyethylene oxide, and allylamine polymers. Preferably, the cationic fixing agent is a water soluble polymer having a high percentage of cationic groups such as tertiary amino or quaternary ammonium cationic groups. Water soluble polycationic quaternary ammonium polymers, and most preferably polydimethyldiallyl-ammonium chloride, are most preferred in combination with silica pigment because the level of the agent may be varied substantially without flocculating the other coating ingredients. An example of this product is Conductive Polymer 261 LV available from Nalco Chemical Corp., Naperville, Ill. (previously available under the trade name Lectrapel marketed by Calgon Corporation, Water Management Division, Pittsburgh, Pa.). The cationic fixing agent is added in an amount of about 4 to about 10 bone dry weight parts per 100 parts of pigment.

Alumina pigments may be used for the combined effects of improved whiteness and rheology. For the purposes of this application, the term "alumina" is intended to broadly refer to aluminum oxide [$Al_2O_3$], aluminum trihydrate [$Al(OH)_3$] and other conventional aluminum containing pigments. These pigments also provide some alkalinity, which is desirable for use with alkaline-stabilized ink jet dyes. Alumina pigments can be stable at both cationic and low pH conditions.

Although several alumina pigments would work in the formulation of the invention, a dry alumina that can be added directly to the coating formulation of the invention and readily dispersed is preferred. One such product is Martifin OL-107 marketed by Martinswerk GmbH Bergheim, Germany. The alumina pigment readily disperses in the coating and is compatible with the other coating ingredients. The Martifin pigment, while increasing coating solids, improves rheology at the same time. Thus, inclusion of this pigment allows application by blade coater and achieves desirable coat weights of approximately 13 gm/$m^2$ at 35% solids. This pigment also provides an acceptable TAPPI brightness of 87 in a coating without fluorescent whitening agents.

The preferred silica type pigments are well suited for ink jet printing due to their high absorption properties. When evaluating the characteristics of voids in silica pigments, it is important to distinguish between primary particles, secondary or agglomerated particles, and associated voids. The primary particles of some silicas agglomerate, that is, groups of primary particles cluster to form secondary particles. Other silicas lack agglomerates. Further, the structure of the primary particle may vary depending on the manufacturing process. Precipitated and gel processes produce porous primary particles, while the fumed silica process produces relatively small, glassy, non-porous particles. As a result, different void structures are created. Depending on the nature of the silica, there may be voids between secondary particles, voids between primary particles within the secondary particle structure, and voids within the primary particle.

For purposes of the present application, the term "absorptive silica" is intended to refer to a silica where the primary particles are porous and capable of absorbing water. Also for the purposes of this application, the term "non-agglomerated" refers to a silica substantially free from agglomerates, i.e., the primary particles do not exhibit a tendency to cluster into secondary particles. Gel silicas are preferred as non-agglomerated, absorptive silicas, but some precipitated and hybrid silicas may also be non-agglomerated and absorptive. Generally, fumed silicas agglomerate and are not absorptive. For a further discussion of the properties of silica minerals see Withiam, Michael C., *Silica Pigments for Ink Jet Printing*, article presented at 1996 TAPPI Coating Conference, Nashville, Tenn., May 21, 1996. Precipitated silicas, calcium silicates, and diatomaceous earth also have good absorption capabilities, but aqueous dispersions thereof have pH values that normally range 7.0 to 9.5.

Silica gels are the preferred form of silica to be used as the pigment. When dispersed, some silica gels have pH values ranging from 3.5 to 11.5, with many in the 4.5 to 5.5 range. The physical properties of commercially available silica gels are as follows:

| | |
|---|---|
| Surface Area | 150–900 $m^2/g$ |
| Pore Volume | 0.4–2.2 cc/g |
| Oil Absorption | 35–300 gm/100 g (35–300%) |
| pH | 3.5–11.5 |
| Average Particle Size | 2–17$\mu$ |

Ink jet print quality and coating rheology require a special set of properties. Silicas with high surface areas, above 400 $m^2/g$, are desiccants. Desiccants are unacceptable for coating formulations because they absorb moisture from the air and thereby reduce ink absorptive capacity. Silica gels with low pore volumes, less than 0.5 cc/g, are undesirable, as they exhibit insufficient water absorption capacity. High pore volumes are desirable for water absorption capacity, but volumes above about 2.0 cc/g give excessively high coating viscosities. Also, larger particle sizes are preferred for having high pore volume, but particle sizes greater than 16$\mu$ can give poor coating rheology. Thus, the preferred properties of the silica pigment in the coating composition of the invention are as follows:

| | |
|---|---|
| Surface Area | 340 $m^2/g$ |
| Pore Volume | 1.2 cc/g |
| Oil Absorption | 180 gm/100 g (180%) |
| pH | 4.5 to 5.5 |
| Particle Size | 10–12$\mu$ |

Pigments meeting these criteria include Syloid 620 and Sylojet P612 from Grace Davison, W. R. Grace & Co., Connecticut. Sylojet P612 is preferred as it has no particles of diameter greater than 25$\mu$ that may cause scratches in the coating layer.

A bright coating and one that is FDA approved for food packaging uses is desirable for many coated paper applications. Accordingly, FDA approved fluorescent whitening agents may prove useful for some embodiments of coating formulations of the invention. While many fluorescent whitening agents may be suitable to a certain degree, they must be stable in acid conditions and must be tolerant of the cationic coating to give optimum results. Most fluorescent whitening agents do not satisfy these criteria. A commercial example of a preferred FDA approved whitening agent that meets these criteria is Ciba-Geigy's Tinopal 5000, available from Ciba-Geigy Corp., Greensboro, N.C.

The preferred sizing agent for use in formulations having a silica pigment is of a styrene acrylic dispersion type. It is noted that as used herein, the term "sizing agent" is intended to refer to materials having a primary sizing function, i.e., to control spreading of ink drops in the X-Y plane on the coating surface.

Suitable sizing agents of the styrene acrylic dispersion variety are Acronal PR8689 from BASF Corp. (BASF may have ceased production of this material); UniQ-Print 8000 from Sequa Chemicals, Inc; Chromaset 600 and Chromaset 800 Surface Sizing Treatments from Hercules, Inc., Wilmington, Del.; Cartacol CL liquid from Clariant Corp.; and Baysynthol AGP available from Bayer Corp, Pittsburgh, Pa. Regardless of the brand of styrene acrylic sizing agent, the bone dry level of addition should remain the same. The amount ofthe sizing agent used will have a direct influence on the diameter of the dots that are printed by a given printer at a fixed resolution. Preferably, from 1–10 parts dry weight sizing agent are added per 100 parts pigment. Most preferably, about 7.5 parts are added.

The sizing agent used may also affect ink drying time and stability of the coating composition. Use of a styrene acrylic dispersion sizing agent, particularly when added at the end of the coating makedown process, has resulted in excellent ink drying times and good coating stability. "Stability" as used herein is intended to refer to the ability of a coating composition to remain in suspension with substantially no precipitation of solids or other grit formation. It is noted for instance that although starch may be a suitable sizing agent for some applications, coating formulations using starch may have a short shelf life due to biological growths.

The order of addition of materials is important with regards to the binder, the cationic fixing agent, the pigment (s), and the sizing agent. Although the order of addition may be varied, a preferred order of addition has been discovered to reduce grit, improve rheology, and improve stability. In particular, a preferred order of addition generally comprises 1) binder (or at least a portion thereof), 2) cationic fixing agent, 3) pigment, and 4) sizing agent.

Suprisingly, it has been discovered that ink dry times and ink dot formation are dramatically improved by adding the styrene acrylic sizing agent at the end of the makedown process. The exact cause is not known, but it is believed that micron sized islands of sizing agent are formed in the dried coating surface. These islands permit the ink solvent to be rapidly absorbed, while limiting spreading of the dot on the plane of the surface. Tests show that dry times have been reduced from about 50 seconds to substantially instantaneous as a result of adding the sizing agent at the end of the makedown process as opposed to addition at the beginning of the process.

The cationic fixing and sizing agents are interactive. If improperly combined, they can agglomerate and cause formation of grit and rheology problems. The polyvinyl alcohol binder acts as a protective colloid for the cationic fixing agent against reaction with the sizing agent. By protecting the cationic fixing agent and the sizing agent against unwanted interaction, agglomeration and, hence, grit formation are substantially prevented from occurring in the coating composition. Thus, desirable benefits are achieved by mixing the polyvinyl alcohol binder (or at least a portion thereof) with the cationic fixing agent prior to introduction of the sizing agent. It is noted that it is possible to prepare coatings of the invention by adding the polyvinyl alcohol binder in two or more portions.

Also, the composition is preferably cooled to a temperature of at or below 49° C. (120° F.), and more preferably at or below 40° C. (104° F.) prior to addition of sizing agent to ensure that the sizing agent does not react with the cationic fixing agent. If the composition temperature is above 49° C. (120° F.), it has been discovered that the cationic fixing agent or a reaction product thereof may cause the sizing agent to precipitate out of solution as the sizing agent is added.

To achieve the desired coating properties and ink jet qualities, at the preferred low pH, silica gel pigment coating composition with sizing agent is preferably made down with the following order of addition while undergoing continuous high shear mixing:

| Bone Dry Weight | Material | Wet Weight |
|---|---|---|
| — | Water | 35.7 |
| 30 | Polyvinyl alcohol @ 15% solids | 200.0 |
| 10 | Cationic fixing agent @ 40% solids | 25.0 |
| 25 | Alumina @ 100% | 25.0 |
| 75 | Silica pigment @ 97% solids | 77.0 |
| 10 | Polyvinyl alcohol @ 15% solids | 67.0 |
| 2[1] | Fluorescent whitening agent | 2.0 |
| 7.5 | Sizing Agent @ 47% solids | 16.0 |

[1]For the fluorescent whitening agent, the two parts listed are parts in liquid form as received from the supplier.

If polyvinyl alcohol (PVOH) is the selected binder, it should first be dispersed in water before beginning the make-down process. Preferably, the polyvinyl alcohol is cooked at 15% solids in water for at least 30 minutes at 95° C. This cooking process completely disperses the polyvinyl alcohol in the water. Disperser speed may then be increased as required to add sufficient shear to disperse the alumina pigment. The disperser can be of any of the normal dispersing blades such as Cowles or Gaulin. Alumina can be rapidly added to the coating as the pigment is readily dispersed.

After dispersing the alumina pigment for 10 minutes, the silica pigment is then added. The silica pigment should be added slowly into the vortex so it may be completely wetted out and dispersed before additional pigment is added. The disperser speed should be high enough to support a vortex into which the silica is added. Silica pigment added anywhere else but into the vortex may buildup on the tank wall and harden. It will not be properly dispersed. Both the cationic agent and silica pigment should be added at the indicated points of addition to avoid excessively high viscosities, incompatibilities, and grit formation.

After the silica pigment addition is complete, the remaining polyvinyl alcohol and any additives, e.g., a fluorescent whitening agent, are added. The coating is then mixed for an additional 10–20 minutes depending on volume. The composition is then preferably cooled to a temperature at or below 49° C. (120° F.), and more preferably to at or below 40° C. (104° F.). After cooling, a sizing agent at about 47% solids is added to the make-down vessel. As mentioned above, it is preferred that the polyvinyl alcohol binder and the cationic fixing agent are mixed together and the composition be cooled before introduction of the sizing agent. The polyvinyl alcohol binder functions to prevent unwanted reactions from occurring between the sizing agent and the cationic fixing agent. Without this protective action, the cationically charged fixing agent may tend to attract sizing agent particles and interact with them, causing grit in the coating composition.

After allowing at least several minutes under dispersion for mixing to occur, the coating composition is then ready for use.

The solids content of the preferred coating composition suspension should be above 30%, and preferably above 35% to achieve coat weights of at least 7 gm/m$^2$ (5 lb/3300 ft$^2$) with conventional coating equipment. Desirably, the percent solids should be as high as possible to reduce the energy needed to dry the coating composition on the substrate. It has been found that above about 38% solids the coating composition of the invention is difficult to smoothly apply with conventional equipment. Solids content of 35–38% provides desirable coat weights of about 10 gm/m$^2$ (7 lb/3300 ft$^2$).

The present invention further comprises applying the coating composition of the invention to one or both sides of a substrate. The substrate may comprise a variety of types of paper webs or plastic substrates such as Mylar or the like. Paper webs may include groundwood-free sheets, groundwood sheets, or a combination thereof. The basis weight of acceptable paper substrates may vary greatly, from very light Bible papers having basis weight of about 32 gm/m$^2$ to heavy, specialty papers having basis weight of 450 gm/m$^2$ or more. Paper substrates may be uncoated, size press coated, or precoated, and the paper may be machine-glazed or machine finished. Depending on the nature of the substrate, a precoating or other treatment maybe useful to reduce porosity, or to provide a better bonding surface for the subsequent coating, or to better prevent migration of the subsequent coating into the web. Preferably, rosin or other sizing is added to achieve 40 or less gm/m$^2$/min Cobb Size to reduce penetration of liquid into the web. (Cobb Size is a standard test to determine the amount of water absorbed during contact with the web and is measured in grams per square meter per minute.)

One or both sides of the paper web may be precoated with size solution to provide brightness and color and to provide sufficient holdout for the final coating. The precoating is applied in a conventional manner and may contain conventional pigments, binders and sizing agents. Preferably, the TAPPI brightness is 85 or greater, and the TAPPI "b" color is equal to or less than 2. If the subsequently applied ink-receiving coat will be applied to only one side of the web, a lightweight coating may also be applied to the other side of the web to minimize potential sheet curl. As will be appreciated, such coatings may be referred to as "anti-curl" coatings.

The precoat may comprise conventional pigments such as clay, titanium dioxide, calcium carbonate and others well known to those skilled in the art. The binders may comprise starch, soy protein, latex and the like. A sizing agent maybe employed such as rosin, starch and other known sizing agents. The base web is preferably sized at values less than 40 gm/m$^2$/min Cobb Size, and the coat weight is in the order of about 3 to about 8gm/m$^2$ (2–5 lb/3300 ft$^2$).

A preferred substrate for cut-size ink jet papers comprises a low ash base stock made square (having similar cross-direction "CD" and machine-direction "MD" physical properties), having a basis weight of between 74–119 $gm/m^2$. The base stock is size coated with a light starch and pigment coating and dried prior to application of the ink receptive coating.

A preferred substrate suitable for ink jet label paper comprises machine glazed ("Yankee") 48–65 $gm/m^2$ base stock with a wet strength resin in the base sheet to prevent cockle, and that preferably has been internally sized to provide a Cobb Size of less than 40 $gm/m^2$/min. The ink receptive coating is applied to the machine glazed side of the sheet. The back side of the sheet is coated with a pigment-latex coating for anti-curl.

After the web has been dried, the ink receptive coating of the invention is preferably applied over at least one side using a conventional coater, such as a trailing blade or rod, a roll coater, a gravure coater, an air knife, a film press, or the like. After application, the coating is dried. The desired coat weight is at least 7 $gm/m^2$ (5 lb/3300 ft2) and preferably 8–15 $gm/m^2$ (5.5–10 lb/3300 ft $^2$) If the weight is significantly below 7$gm/m^2$, the resulting paper will exhibit less than desirable print quality and excessive ink penetration. After drying, the ink receptive coating layer will have a thickness of at least 8$\mu$ and preferably from about 8 to about 12$\mu$. The pigments in the coating provide an absorptive capacity for the liquid component of the ink to be applied, and the thickness of the coating layer is correlated to the absorption rate and, hence, ink drying time.

Depending on resolution of the printer, the size of the dots to be printed ranges from about 75 to 160$\mu$. Inkjet printing of 1000 to 1400 dots per inch, when available, will require dots having a diameter of down to 40$\mu$ or less. The present invention contemplates the use of various binders and sizing agents, depending on the resolution needed for a printer. The binder level and sizing agents contribute to the control of dot diameter and other properties.

In further illustration of the present invention, the following examples are presented. It is noted that in Examples 9–26 below, the listing of ingredients is not intended to specify an order of addition. "Parts" in each example refer to bone dry parts by weight, except for the fluorescent whitening agent that is parts in liquid form as received from the supplier. For the purpose of the Examples, the below definitions are applicable:

Hewlett Packard 560 Print Quality:

- Color Mottle: non-uniformity of ink density in the solid print areas. Rated from 1 to 3 with 3 being best and having little or no mottle.
- Pigment Black Bleed: A general increase in printed line width. Rated from 1 to 3 with 3 being best and having little or no increase.
- Dry Time: Time in seconds for 4-color black to visually dry.

Epson Print Quality:

- Color Intensity: rated 1 to 9 with 9 being best and having most intense colors.
- Halftone Mottle: rated 1 to 9 with 9 being best and having no mottle.

Cockle: the degree to which the sheet will deviate from its original flatness upon printing or having coating applied to it. "OK" or "poor" as observed.

Scratch Resistance: The degree to which coating comes off the sheet when scratched with the fingernail. Rated from 1 to 5 with 5 being best having substantially no removal of coating.

Tape Pull: A measure of the amount of coating that separates from the fiber and adheres to cellophane tape (3M 600 Scotch Tape) when tape is pressed on and then slowly (about 5 seconds) pulled off at 90 degrees to the sheet. Rated from 1 to 5 with 5 being best and having substantially no removal of coating.

Dusting: The degree to which coating will come off the sheet when the sample surface is rubbed against a black sheet under standard pressure. Rated from 1 to 5 with 5 being best and having substantially no removal of coating. We also measure the optical density of the black paper before and after testing.

EXAMPLE 1

An 86 $gm/m^2$ prime coated groundwood-free paper was used as the base sheet. The base sheet was coated using a conventional blade coater at a weight of 11.5 $gm/m^2$ on the wire side. Two different compositions were madedown at 36% solids; one with 5 parts of the preferred sizing agent and one with 10 parts:

| Bone Dry Parts | Materials |
|---|---|
| 30 | Airvol 805 low molecular weight, partially hydrolyzed polyvinyl alcohol polymer |
| 5, 10 | Chromaset 600 styrene acrylic dispersion sizing agent |
| 10 | Conductive Resin 261 LV cationic agent (polycationic quaternary ammonium polymer) |
| 75 | Grace-Davison Syloid 620 silica gel |
| 25 | Martifin OL-107 alumina trihydrate |
| 10 | Airvol 805 polyvinyl alcohol |
| 2 | Tinopal HST fluorescent whitening agent |

The dried sheets were then tested, the results were as follows:

| | | |
|---|---|---|
| Wire Side Analysis: | | |
| Parts Sizing Agent: | 5 | 10 |
| Coat Weight ($gm/m^2$) | 11.5 | 11.5 |
| Smoothness | | |
| PrintSurf | 8.29 | 8.30 |
| Hagerty | 282 | 281 |
| Opticals | | |
| Brightness | 94.0 | 93.8 |
| "b" | −2.2 | −2.2 |
| FWA Contribution | 6.3 | 6.3 |
| Strength | | |
| Tape Pull | 4 | 3.5 |
| Scratch | 4 | 5 |
| Coefficient of Friction | | |
| Static | 0.95 | 0.91 |
| Kinetic | 0.68 | 0.66 |
| Epson Stylus Print Tests | | |
| Intensity | 8 | 8 |
| Half-Tone Mottle | 7.5 | 7.5 |
| Total | 15.5 | 15.5 |
| Average Density | 1.58 | 1.54 |
| Hewlett Packard 560 Print Tests | | |
| Ink Dry Time (sec.) | 51 | 48 |
| Mottle | 2.5 | 2.5 |
| Pigment Black Bleed | 2.5 | 2.5 |

While this formulation produced satisfactory results when made down in lab and pilot scale, it was less satisfactory on commercial production scales because of excessive grit formation.

Example 2

In Example 2, the ink jet receptor coating was applied by bench blade coater to the machine glazed side of 55 gm/m$^2$ base sheet manufactured on a Yankee paper machine. The base paper furnish was 100% chemical pulp, 70 SWK/30 HWK. Rosin size was added to manufacture Cobb Size target of 50 gm/m$^2$/min (2 minute test). Wet strength resin was also added to give 8–10% wet strength The Kajaani formation was approximately 75. The coating solids was 35.5%. The coat weight applied was 11.5 gm/m$^2$. The coating formulation and makedown procedure were as follows:

| BD | Material | $X_1$ Wet Basis |
|---|---|---|
| — | Water | 38.3 |
| 30 | Airvol 805 PVOH @ 15% | 200.0 |
| | Reduce temperature to ≦ 115° F. | |
| 10 | Conductive Resin 261 LV @ 40% | 25.0 |
| 25 | Martifin OL-107 Alumina @ 100% | 25.0 |
| 75 | Sylojet 612 @ 97% | 77.0 |
| 10 | Airvol 805 PVOH @ 15% | 67.0 |
| | Reduce temperature to ≦ 115° F. | |
| 2 | Fluorescent whitening agent Ciba-Geigy's Tinopal HST as received | 2.0 |
| 7.5 | BASF Acronal PR 8689 @ 50% | 15.0 |

The paper properties were as follows:

| | |
|---|---|
| Machine Glazed Side | |
| Coat Weight | 11.5 gm/m$^2$ |
| Smoothness | |
| PrintSurf | 8.07 |
| Opticals | |
| Brightness | 93.5 |
| "b" | −3.9 |
| Fluorescent Contribution | 6.2 |
| Opacity | 83.6 |
| Strength | |
| Scratch Resistance | 3 |
| Tape Pull | 5 |
| Epson Stylus Print Tests | |
| Intensity | 7.5 |
| Half-Tone Mottle | 7.5 |
| Average Density | 1.59 |
| Hewlett Packard 560 Print Quality | |
| Ink Dry Time, (sec) | 0 |
| 4-Color Mottle | 2.5 |
| Pigment Black Bleed | 3.0− |

All properties were similar to Example 1 except ink dry times were much shorter (better). In addition, this formulation has no grit when madedown on commercial coating equipment. The improvements were due to the addition of the styrene acrylic dispersion sizing agent (ACRONAL PR8689) sequentially at the end of the makedown process.

Example 3

In this example, the same coating as in Example 2 was applied by bench blade coater to the machine glazed side of 60 gm/m$^2$ Yankee machine manufactured base paper. The furnish for this base paper was 100% chemical fiber, 50 SWK/50 HWK. The base paper had 90 Kajaani formation, Cobb Size of 40 gm/m$^2$/min (2 minute test), and 10% wet strength. The coating solids concentration was 34.5%, and the coat weight was 10 gm/m$^2$. The paper and print properties were as follows:

| | |
|---|---|
| Machine Glazed Side | |
| Coat Weight | 10.0 gm/m$^2$ |
| Opticals | |
| Brightness | 91.55 |
| "b" | −1.48 |
| Fluorescent Contribution | 4.7 |
| Opacity | 85.8 |
| Epson Stylus Print Tests | |
| Intensity | 8.0 |
| Half-Tone Mottle | 8.0− |
| Average Density | 1.54 |
| Hewlett Packard 560 Print Quality | |
| Ink Dry Time, (sec) | 0 |
| 4-Color Mottle | 3.0− |
| Pigment Black Bleed | 2.5+ |

This 90 Kajaani formation machine glazed base gave improved print mottle with both the Epson and HP test prints, as compared to 75 Kajaani formation in Example 2.

Examples 4, 5, and 6

Examples 4, 5, and 6 were prepared on a pilot coater. The base paper was the same as used in Example 3: 60 gm/m$^2$ machine glazed base with 90 Kajaani formation, 40 gm/m$^2$/min Cobb Size, and 10% wet strength. The formulation and makedown procedure for Example 4 were the same as Example 3 except that fluorescent whitening agent Tinopal 5000 was used in place of the HST. With this change, this formulation contained all FDA approved ingredients. The formulation for Example 5 was the same as Example 4 except that 7.5 parts Baysynthol AGP styrene/acrylic sizing agent was used in place of 7.5 parts Acronal PR8689. The formulation in Example 6 was the same as in Example 4 except that 7.5 parts Cartacol CL styrene/acrylic sizing agent was used in place of 7.5 parts Acronal PR8689.

In Examples 4–6, the final coating solids concentrations were 35.5%. These coatings were applied to both sides of the machine glazed base, by dip roll inverted blade coater, in amounts of 8 gm/m$^2$ to the back side and 11.5 gm/m$^2$ to the machine glazed side. The coating sequence was back side first, machine glazed side second. The tested properties follow:

| Example | 4 | 5 | 6 |
|---|---|---|---|
| Sizing Agent | Acronal PR8689 | Baysynthol AGP | Cartacol CL |
| Coat Weight | | | |
| Back side/MG, gm/m$^2$ | 8/11.5 | 8/11.5 | 8/11.5 |
| Opticals | | | |
| Brightness | 93.7/95.1 | 93.3/94.3 | 93.3/94.5 |
| "b" | −2.9/−3.8 | −2.4/−3.0 | −2.5/−3.2 |
| Fluorescent Contribution | 6.1/7.1 | 5.6/6.3 | 5.8/6.5 |
| Opacity | 86.6 | 86.9 | 86.2 |

-continued

| Example | 4 | 5 | 6 |
|---|---|---|---|
| Smoothness | | | |
| PrintSurf | 7.53/7.41 | 8.33/7.71 | 7.88/7.64 |
| Strength Tests | | | |
| Scratch Resistance | 4/3.5 | 4/4 | 4/4 |
| Tape Pull | 5/3 | 5/5 | 5/5 |
| Dust Tests | | | |
| Rub Rating | 5/5 | 5/5 | 5/5 |
| Density Change | 0.00/0.01 | 0.01/0.03 | 0.02/0.02 |
| Epson 800 Print Quality | | | |
| Intensity | 7/7 | 7.5/7.5 | 7.5/7.5 |
| Halftone Mottle | 8/7.5 | 8/8− | 8/8− |
| Average Density | 1.55/1.50 | 1.57/1.57 | 1.58/1.55 |
| Hewlett Packard 560 Print Quality | | | |
| Dry Time (sec.) | 0/0 | 0/0 | 0/0 |
| 4-Color Mottle | 3−/3− | 3−/3− | 3/3− |
| Pigment Black Bleed | 3−/3− | 3−/3− | 2.5+/3− |

The quality of these samples was similar and excellent in every respect. The properties were almost identical to those of Examples 2 and 3. Thus, this formulation and makedown procedure gave similar results on both lab and pilot equipment.

Example 7

Example 3 was repeated using commercial makedown and application equipment. The coating was very stable, had substantially no grit, had good rheology, and it did not change with time. It was applied to the same base paper as used in Example 3. The coating was applied to the machine glazed side at 11 gm/m$^2$ by fountain/inverted blade. The paper properties follow.

| | |
|---|---|
| Machine Glazed Side | |
| Coat Weight | 11 gm/m$^2$ |
| Opticals | |
| Brightness | 94.7 |
| "b" | −3.9 |
| Fluorescent Contribution | 6.5 |
| Opacity | 84.6 |
| Smoothness | |
| Print Surf | 8.67 |
| Strength Tests | |
| Scratch Resistance | 5 |
| Tape Pull | 4.7 |
| Dust Tests | |
| Rub Rating | 5 |
| Density Change | 0.04 |
| Epson Stylus Print Quality | |
| Intensity | 7 |
| Half-Tone Mottle | 7.5 |
| Average Density | 1.59 |
| Hewlett Packard 560 Print Quality | |
| Ink Dry Time, (sec) | 0 |
| 4-Color Mottle | 2.5 |
| Pigment Black Bleed | 3.0 |

The paper quality was very similar to Examples 3 and 4 and was considered very good.

Example 8

Paper in Example 7, following the application of the ink jet receptor coating on the machine glazed, was then coated on the back side with an anti-curl coating. This back side coating was applied by the same commercial coating equipment (fountain/blade) as the ink receptor coating. The coat weight was 3.5–5.0 gr./m$^2$.

| Bone Dry Parts | Materials |
|---|---|
| 80.0 | 90–92 Brightness Clay |
| | Water to 50% Solids |
| 0.05 | Acrylic Dispersant |
| 20.0 | Hydrated Alumina @ 100% |
| | Disperse for 10 minutes |
| 15.0 | Starch @ 35% |
| 10.0 | Styrene/Butadiene Latex |
| 1.0 | Glyoxal Insolubilizer |
| 2.0 | Fluorescent Whitening Agent (as received weight |
| | $NH_4OH \rightarrow$ pH 9.5 |
| 0.14 | Alkali Sensitive Thickening Agent |
| | 50% Solids |

The final curl as measured by a 12" square diagonal cross, X, cut in the paper was 1.0 cm. CD to the back side. The back side opticals were as follows:

| | |
|---|---|
| Brightness | 91.0 |
| "b" | −1.6 |
| Fluorescent Contribution | 3.7 |

This back side anti-curl coating had no effect on the ink jet receptor coating properties, as shown by the properties below:

| Ink Jet Receptor Properties: | |
|---|---|
| Opticals | |
| Brightness | 94.8 |
| "b" | −3.8 |
| Fluorescent Contribution | 6.1 |
| Strength | |
| Scratch Resistance | 4.5 |
| Tape Pull | 5 |
| Dust Test | |
| Rub Rating | 5 |
| Density Change | 0.04 |
| Epson Stylus Print Tests | |
| Intensity | 7 |
| Half-Tone Mottle | 7.7 |
| Average Density | 1.59 |
| Hewlett Packard 560 Print Quality | |
| Ink Dry Time, (sec) | 0 |
| 4-Color Mottle | 2.5 |
| Pigment Black Bleed | 3.0 |

Example 9

An ink receptive coating was applied by a laboratory bench blade coater at 12.2 gm/$m^2$ to a 62 pound (100 gm/$m^2$) precoated, groundwood-free base sheet. The ink receptive coating composition was prepared at 35% solids and a pH value of 5.4 as follows:

| Parts | Materials |
|---|---|
| 75 | Grace-Davison Syloid 620 silica gel |
| 25 | Martifin OL-107 alumina trihydrate |
| 50 | Airvol 805 low molecular weight, partially hydrolyzed polyvinyl alcohol |
| 6 | Lectrapel cationic fixing agent |

Example 10

Example 9 was repeated, with the coating composition as follows:

| Parts | Materials |
|---|---|
| 75 | Grace-Davison Syloid 620 silica gel |
| 25 | Martifin OL-107 alumina trihydrate |
| 40 | Airvol 805 low molecular weight, partially hydrolyzed polyvinyl alcohol |
| 6 | Lectrapel cationic fixing agent |

Example 11

Example 9 was repeated, with the coating composition as follows:

| Parts | Materials |
|---|---|
| 75 | Grace-Davison Syloid 620 silica gel |
| 25 | Martifin OL-107 alumina trihydrate |
| 30 | Airvol 805 low molecular weight, partially hydrolyzed polyvinyl alcohol |
| 6 | Lectrapel cationic fixing agent |

Example 12

An ink receptive coating was applied by a laboratory bench blade coater to the same base sheet in Examples 9 through 11. The ink receptive coating composition was prepared at 38% solids and a pH value of 5.6 as follows:

| Parts | Materials |
|---|---|
| 75 | Grace-Davison Syloid 620 silica gel |
| 25 | Martifin OL-107 alumina trihydrate |
| 40 | Airvol 805 low molecular weight, partially hydrolyzed polyvinyl alcohol |
| 4 | Lectrapel cationic fixing agent |

Example 13

Example 12 was repeated, with the coating composition as follows:

| Parts | Materials |
|---|---|
| 75 | Grace-Davison Syloid 620 silica gel |
| 25 | Martifin OL-107 alumina trihydrate |
| 40 | Airvol 805 low molecular weight, partially hydrolyzed polyvinyl alcohol |
| 6 | Lectrapel cationic fixing agent |

Example 14

Example 12 was repeated, with the coating composition as follows:

| Parts | Materials |
|---|---|
| 75 | Grace-Davison Syloid 620 silica gel |
| 25 | Martifin OL-107 alumina trihydrate |
| 40 | Airvol 805 low molecular weight, partially hydrolyzed polyvinyl alcohol |
| 10 | Lectrapel cationic fixing agent |

Example 15

An ink receptive coating was applied by a laboratory bench blade coater to the same base sheet as in Examples 9 through 14. The ink receptive coating composition was prepared at 35% solids and a pH value of 5.6 as follows:

| Parts | Materials |
|---|---|
| 75 | Grace-Davison Syloid 620 silica gel |
| 25 | Martifin OL-107 alumina trihydrate |
| 40 | Airvol 805 low molecular weight, partially hydrolyzed polyvinyl alcohol |
| 4 | Lectrapel cationic fixing agent |

Example 16

Example 15 was repeated, with the coating composition as follows:

| Parts | Materials |
|---|---|
| 75 | Grace-Davison Syloid 620 silica gel |
| 25 | Martifin OL-107 alumina trihydrate |
| 40 | Airvol 805 low molecular weight, partially hydrolyzed polyvinyl alcohol |
| 6 | Lectrapel cationic fixing agent |

Example 17

Example 15 was repeated, with the coating composition as follows:

| Parts | Materials |
|---|---|
| 75 | Grace-Davison Syloid 620 silica gel |
| 25 | Martifin OL-107 alumina trihydrate |
| 40 | Airvol 805 low molecular weight, partially hydrolyzed polyvinyl alcohol |
| 10 | Lectrapel cationic fixing agent |

Example 18

An ink receptive coating was applied by a laboratory bench blade coater to the same base sheet as in Example 9 through 17. The ink receptive coating composition was prepared at 35% solids and pH value of 5.6 as follows:

| Parts | Materials |
|---|---|
| 90 | Grace-Davison Syloid 620 silica gel |
| 10 | Martifin OL-107 alumina trihydrate |
| 40 | Airvol 805 low molecular weight, partially hydrolyzed polyvinyl alcohol |
| 4 | Lectrapel cationic fixing agent |

Example 19

Example 18 was repeated, with the coating composition as follows:

| Parts | Materials |
|---|---|
| 90 | Grace-Davison Syloid 620 silica gel |
| 10 | Martifin OL-107 alumina trihydrate |
| 40 | Airvol 805 low molecular weight, partially hydrolyzed polyvinyl alcohol |
| 6 | Lectrapel cationic fixing agent |

Example 20

Example 18 was repeated, with the coating composition as follows:

| Parts | Materials |
|---|---|
| 90 | Grace-Davison Syloid 620 silica gel |
| 10 | Martifin OL-107 alumina trihydrate |
| 40 | Airvol 805 low molecular weight, partially hydrolyzed polyvinyl alcohol |
| 10 | Lectrapel cationic fixing agent |

Each of the Examples 9–20 was tested for print quality and other factors. The results are shown in table 1. An explanation of each rating follows the table. Examples 9–11 were tested to explore different binder levels. The strength tests of tape pull and scratch resistance were evaluated. The results reveal that 30 parts of Airvol 805 polyvinyl alcohol binder (Example 11) is at the point of unacceptable strength, 50 parts is higher than needed (Example 9), while 40 parts provides acceptable to good results (Example 10).

Examples 12–14, 15–17 and 18–20 were tested to evaluate the level of cationic fixing agent, in this case, Lectrapel (currently available as Conductive Polymer 261 LV from Nalco Chemical Co., Naperville, Ill.). Examples 12–14 were conducted at 38% solids, while 15–17 were conducted at 35% solids. Examples 18–20 were tested with a different mixture of pigments. In these three series of tests, print quality was evaluated. The tests showed increasing the level of cationic fixing agent consistently improved print quality and strength, see in particular the increasing average density test results. Ten parts of Lectrapel fixing agent per 100 parts of pigment is optimum. Above 10 parts, it is believed that the coating composition becomes too chemically interactive, developing viscosity changes over time that cannot be controlled. It is also noted that higher levels of Lectrapel extend ink dry times.

A comparison of Examples 12–14 to Examples 15–17 shows the effect of the solids content. In particular the lower solids formulation used in Examples 15–17 showed consistently better ink dry times. A comparison of Examples 15–17 to Examples 18–20 illustrates the effects of the pigment mixture. Examples 15–17 are a 75/25 ratio of silica/alumina while Examples 18–20 are a 90/10 ratio. The 75/25 ratio exhibited consistently better strength and rheology. The 90/10 ratio gave slightly better print quality and faster ink dry times.

TABLE 1

| Example | 9 | 10 | 11 | 12 | 13 | 14 | 15 | 16 | 17 | 18 | 19 | 20 |
|---|---|---|---|---|---|---|---|---|---|---|---|---|
| Formulation | | | | | | | | | | | | |
| Syloid 620 | 75 | 75 | 75 | 75 | 75 | 75 | 75 | 75 | 75 | 90 | 90 | 90 |

TABLE 1-continued

| Example | 9 | 10 | 11 | 12 | 13 | 14 | 15 | 16 | 17 | 18 | 19 | 20 |
|---|---|---|---|---|---|---|---|---|---|---|---|---|
| Martifin OL-107 | 25 | 25 | 25 | 25 | 25 | 25 | 25 | 25 | 25 | 10 | 10 | 10 |
| Airvol 805 | 50 | 40 | 30 | 40 | 40 | 40 | 40 | 40 | 40 | 40 | 40 | 40 |
| Lectrapel (Conductive Polymer 261) | 6 | 6 | 6 | 4 | 6 | 10 | 4 | 6 | 10 | 4 | 6 | 10 |
| pH value | 5.4 | 5.4 | 5.4 | 5.6 | 5.4 | 5.2 | 5.6 | 5.4 | 5.6 | 5.6 | 5.5 | 5.2 |
| Application Solids | 35% | 35% | 35% | 38% | 38% | 38% | 35% | 35% | 35% | 35% | 35% | 35% |
| Smoothness | | | | | | | | | | | | |
| Printsurf | 8.19 | 8.1 | 7.96 | 8.21 | 8.20 | 8.22 | 8.04 | 8.03 | 8.07 | 7.92 | 7.92 | 7.98 |
| Hagerty | 301 | 274 | 248 | 266 | 272 | 278 | 265 | 270 | 283 | 263 | 270 | 278 |
| Strength | | | | | | | | | | | | |
| Tape Pull | 5 | 2 | 1 | 2 | 4 | 5 | 1 | 2.5 | 4 | 0 | 1 | 3 |
| Scratch Resistance | 5 | 4 | 2 | 3.5 | 3.5 | 4 | 3 | 3.5 | 4.5 | 1.5 | 1 | 1.5 |
| Epson Stylus | | | | | | | | | | | | |
| Intensity | 8 | 7 | 6 | 8 | 8 | 8+ | 7 | 7 | 7 | 7 | 7 | 7 |
| HTM | 8 | 8 | 9 | 8 | 8 | 8 | 8 | 8 | 8 | 8 | 8 | 8 |
| Total | 16 | 15 | 15 | 16 | 16 | 16+ | 15 | 15 | 15 | 15 | 15 | 15 |
| Avg. Density[1] | 1.56 | 1.50 | 1.40 | 1.50 | 1.53 | 1.55 | 1.46 | 1.49 | 1.53 | 1.51 | 1.52 | 1.58 |
| Hewlett Packard | | | | | | | | | | | | |
| Ink Dry Time(s) | 80 | 21 | 0 | 40 | 51 | 96 | 16 | 33 | 78 | 0 | 0 | 25 |
| Mottle | 2 | 1 | 1 | 1 | 1 | 2 | 2 | 1 | 2 | 2 | 2 | 1 |
| Pigment Black Bleed | 1 | 1 | 2 | 1.5 | 1 | 1 | 1 | 1 | 1 | 2 | 2 | 1 |
| Rheology | 12.1 | 8.9 | 6.3 | 16.0 | 17.9 | 19.9 | 8.6 | 8.9 | 11.9 | 11.3 | 11.7 | 14.2 |

[1]Average of six density readings: 2 Magenta, 2 Red, 2 Black
[2]Average torque $400^{-1\ sec}$, Hercules Viscometer DV-10

Example 21

A 52 pound (77 gm/m$^2$) precoated, groundwood-free paper was used as the base sheet. The base sheet was coated using a conventional blade coater at a coat weight of 11.5 gm/m$^2$on both the wire and felt sides. The following coating composition was made down at 35% solids at a pH value of 5.3:

| Bone Dry Parts | Materials |
|---|---|
| 75 | Grace-Davison Syloid 620 silica gel |
| 25 | Martifin OL-107 alumina trihydrate |
| 40 | Airvol 805 low molecular weight, partially hydrolyzed polyvinyl alcohol |
| 10 | Lectrapel cationic agent (polycationic quaternary ammonium polymer) |
| 2 | Tinopal HST fluorescent whitening agent |

The dried sheets were then tested, the test results were as follows:

| | Wire Side | Felt Side | Qualitative Analysis |
|---|---|---|---|
| Coatweight (gm/m$^2$) | 11.5 | 11.5 | |
| Basis Weight (gm/m$^2$) | 103 | 103 | |
| % Moist. Content | 4.9 | 4.9 | |

-continued

| | Wire Side | Felt Side | Qualitative Analysis |
|---|---|---|---|
| Smoothness | | | |
| PrintSurf | 7.91 | 7.89 | (acceptable) |
| Hagerty | 221 | 224 | (acceptable) |
| Opticals | | | |
| Brightness | 93.6 | 93.4 | (very good) |
| Lightness | 94.7 | 94.9 | (very good) |
| "a" | 2.2 | 2.0 | (good, slight red tint) |
| "b" | −3.1 | −2.9 | (good, slight blue tint) |
| FWA Contribution | 7.0 | 6.6 | (very good) |
| Strength | | | |
| Tape Pull | 4.5 | 4.5 | (excellent) |
| Scratch | 5 | 5 | (excellent) |
| Coefficient of Friction | | | |
| Static | 0.92 | 0.87 | (acceptable) |
| Kinetic | 0.50 | 0.59 | (good) |
| Epson Stylus Print Tests | | | |
| Intensity | 8 | 8 | (very good) |
| Half-Tone Mottle | 8 | 9 | (very good) |
| Total | 16 | 17 | (very good) |
| Average Density | 1.56 | 1.55 | (excellent) |

-continued

| | Wire Side | Felt Side | Qualitative Analysis |
|---|---|---|---|
| Hewlett Packard Print Tests | | | |
| Ink Dry Time | 33 | 0 | (very good) |
| Mottle | 3 | 3 | (very good) |
| Pigment Black Bleed | 2 | 2 | (good) |

Example 22

Sodium oxide (NaOH) was added to a sample resulting from Example 21 to raise the pH value to 7.5. This sample was then applied with a laboratory blade coater at 12.2 gm/m$^2$ to the wire side a 62 pound (92 gm/m$^2$) precoated, groundwood-free base sheet. After drying, the paper was print tested. The print quality was comparable to that of Example 21, but the ink dry time for the 7.5 pH Example 22 sample was about 50% longer than the 5.3 pH sample.

Example 23

An ink receptive coating was applied by a laboratory bench blade coater at 12.2 gm/m$^2$ to a 62 pound (92 gm/m$^2$) precoated, groundwood-free base sheet. The ink receptive coating was prepared at 32.7% solids and a pH value of 5.2, as follows:

| Parts | Materials |
|---|---|
| 60 | Grace-Davison Syloid “C” silica gel<br>17 u particle size<br>2.1 cc/g pore volume |
| 40 | Martifin OL-107 alumina trihydrate |
| 40 | Airvol 805 low molecular weight, partially hydrolyzed polyvinyl alcohol |
| 10 | Lectrapel cationic fixing agent |
| 2 | Tinopal HST fluorescent whitening agent |
| 0.11 | NaOH @ 20% |

Example 24

An ink receptive coating was prepared as in Example 23, except that the pigment mix was varied to 50 parts of Sylojet C and 50 parts of Martifm OL-107. The pH value was 5.3.

The Example 23 and 24 samples had comparable, acceptable print test results. Some adverse bleeding of the pigment black was noted. Example 24 had a longer drying time, most likely due to the lower level of silica gel. The coating layer strength as measured by the tape pull and scratch resistance tests were very low in both Examples 23 and 24.

Example 25

An ink receptive coating was applied by a laboratory bench blade coater at 10.5 gm/m$^2$ to a 62 pound (92 gm/m$^2$) precoated groundwood-free base sheet. The coating composition was prepared at 27.5% solids and a pH of 4.3 as follows:

| Parts | Material |
|---|---|
| 75 | Grace Davison Sylojet C silica gel<br>17 u particle size<br>2.1 cc/g pore volume |
| 25 | Martifin OL-107 alumina trihydrate |
| 20 | Airvol 823 medium molecular weight, partially hydrolyzed polyvinyl |
| 20 | Elvanol 9050 medium molecular weight, fully hydrolyzed polyvinyl |
| 10 | Lectrapel cationic fixing agent |

Example 26

A surface sizing agent was added to the coating composition of Example 25. Specifically, 10 parts of a styrene acrylic copolymer (MSA-150 by Morton International) per 100 parts of pigment were added to the composition. Print tests showed that the addition of the sizing agent significantly improved pigment black print quality, reducing bleeding. However, the Example 26 sample had longer ink dry time than Example 25.

The methods of the present invention thereby solve many otherwise heretofore unresolved problems in an elegant and facile manner. For example, through a novel order of addition, a methods of the invention provides a high solids coating composition that is substantially free from grit, has excellent ink dry times, and has excellent ink jet print characteristics.

While the preferred embodiments of the present invention and representative examples have been shown and described, it is to be understood that various modifications and changes could be made thereto without departing from the scope of the appended claims. For example, those skilled in the art will appreciate that materials equivalent to those specified may potentially be substituted within the scope of the invention as claimed.

What is claimed is:

1. A method for making a coating composition comprising the non-sequential steps of:

mixing a binder in water to form a dispersion, said binder selected from the group consisting of polyvinyl alcohol, starches, latexes, polyvinyl pyrrolidone, and modified cellulose;

adding a cationic fixing agent to said dispersion, said cationic fixing agent selected from the group consisting of: acrylamide acrylic polymers, polyamines, polyethylene oxide, allylamine polymers, and quarternary animonium polymers;

adding a pigment to said dispersion, at least a portion of said pigment comprising silica; and adding a styrene acrylic sizing agent to said dispersion to form the coating composition, wherein the composition has a pH value in the range of 4.5 to 7, and wherein the coating composition has a solids content of at least 30% and is substantially free from grit.

2. A method for making a coating composition as in claim 1 wherein the composition has a pH in the range of 4.5–5.5.

3. A method for making a coating composition as in claim 1 wherein the coating composition has a solids content in the range of 35–38%.

4. A method for making a coating composition as in claim 1 wherein:

said binder comprises a low molecular weight, partially hydrolyzed polyvinyl alcohol binder, and said cationic fixing agent comprises a polycationic quaternary ammonium polymer.

5. A method for making a coating composition as in claim 1 wherein:

the step of adding a pigment comprises adding a pigment comprising at least 50% non-agglomerated, absorptive silica pigment;

the step of mixing a binder in water comprises mixing 30–50 parts by dry weight of polyvinyl alcohol binder for every 100 parts by dry weight of pigment in water;

the step of adding a cationic fixing agent comprises adding 4–10 parts by dry weight of a polycationic quaternaxy ammonium polymer for every 100 parts by dry weight of pigment; and the step of adding sizing agent comprises adding 1–10 parts by dry weight of sizing agent for every 100 parts by dry weight of pigment.

6. A method for making a coating composition as in claim 1, wherein the step of adding a sizing agent further comprises cooling said dispersion to a temperature of less than 49° C. before adding said sizing agent.

7. A method for making a coating composition comprising the sequential steps of:

mixing a binder in water to form a dispersion, said binder selected from the group consisting of polyvinyl alcohol, starches, latexes, polyvinyl pyrrolidone, and modified cellulose;

adding a cationic fixing agent to said dispersion, said cationic fixing agent selected from the group consisting of: acrylamide acrylic polymers, polyamines, polyethylene oxide, allylamine polymers, and quaternary ammonium polymers;

adding a pigment to said dispersion, at least 50% of said pigment comprising silica; and adding a styrene acrylic sizing agent to said dispersion to form the coating composition.

8. A method for making a coating composition as in claim 7 wherein the coating composition formed by the steps has a pH value in the range of 4.5 to 7, a solids content of at least 30%, and is substantially free from grit.

9. A method for making a coating composition as in claim 7 wherein the coating composition formed by the steps has a pH value in the range of 4.5 to 5.5.

10. A method for making a coating composition as in claim 7 wherein the coating composition has a solids content in the range of 35–38% and is substantially free from grit.

11. A method for making a coating composition as in claim 7 wherein the method further comprises the step of cooling said dispersion to a temperature at or below 49° C. prior to the step of adding said sizing agent.

12. A method for making a coating composition as in claim 7 wherein the method further comprises the step of cooling said dispersion to a temperature at or below 40° C. prior to the step of adding said sizing agent.

13. A method for making a coating composition as in claim 7 wherein:

the step of mixing a binder in water comprises mixing 30–50 parts by dry weight of polyvinyl alcohol binder for every 100 parts by dry weight of pigment in water;

the step of adding a cationic fixing agent comprises adding 4–10 parts by dry weight of polycationic quaternary ammonium cationic fixing agent for every 100 parts by dry weight of pigment;

the step of adding a pigment comprises adding a pigment comprising at least 50% non-agglomerated, absorptive silica; and the step of adding sizing agent comprises adding 1–10 parts by dry weight of sizing agent for every 100 parts by dry weight of pigment.

14. A method for making a coating composition as in claim 7, wherein the step of adding pigment to said dispersion comprises adding pigment comprising at least 10% alumina pigment and at least 50% silica pigment, and wherein said alumina pigment is added to said dispersion before addition of said silica pigment.

15. A method for making an ink jet medium comprising the steps of:

preparing a coating composition in accordance with the method set forth in claim 7;

applying the coating composition using a conventional coater to at least one side of a substrate to produce a finished coat weight of 7–13 gm/m$^2$; and drying the composition to produce the ink jet recording medium.

16. A method for making an ink jet medium as in claim 15, wherein the step of applying the coating composition comprises applying the coating composition to both sides of the substrate.

17. A method for making an ink jet recording medium as in claim 15, further comprising the step of applying an anti-curl coat to the other side of the substrate.

18. A method for making an ink jet recording medium comprising the step of:

preparing a coating composition in accordance with the method set forth in claim 7;

applying the coating composition to at least one side of a substrate in an amount to result in a finished coat weight of 7–13 gm/m$^2$; and drying said coating to form the ink jet recording medium.

19. A method for making an ink jet recording medium as in claim 18, wherein the step of applying the coating composition comprises applying the coating composition to both sides of said substrate.

20. A method for making an ink jet recording medium as in claim 18 wherein the step of applying the coating composition comprises applying the coating composition to a front side, and further comprises applying a anti-curl coating to a back side of the substrate.

21. A method for making a coating composition for coating a substrate for ink jet printing, the method comprising the sequential steps of:

adding 30–50 dry weight parts of a partially hydrolyzed low molecular weight polyvinyl alcohol binder per 100 parts of pigment to water to form a dispersion;

adding 4–10 dry weight parts per 100 parts of pigment of a polycationic quaternary ammonium polymer fixing agent per 100 parts pigment to said dispersion;

adding pigment to said dispersion, said pigment comprising at least 50% non-agglomerated, absorptive silica;

cooling said dispersion to at or below 49° C.;

adding 1–10 dry weight parts styrene acrylic sizing agent per 100 parts of pigment to said dispersion to form the coating composition wherein the coating composition has a pH in the range of 4.5 to 7, a solids content of at least 30%, and is substantially free from grit.

22. A method for making a coating composition as in claim 21, wherein the coating composition has a pH in the range of 4.5 to 5.5.

23. A method for making a coating composition as in claim 21, wherein the coating composition has a solids content in the range of 35–38%.

24. A method for making a coating composition comprising the steps of:

selecting one or more pigments that when dispersed in water will have a pH of less than 7.0;

forming an aqueous dispersion of one or more pigments, at least 50% by weight of the pigments comprising a non-agglomerated, absorptive silica, a polyvinyl alcohol binder at a ratio of 30–50 parts dry weight per 100 parts of pigment, a sizing agent at a ratio of 1–10 parts by dry weight per 100 parts dry weight of pigment, and a cationic fixing agent at a ratio of 4–10 parts dry weight per 100 parts of pigment;

adding the polyvinyl alcohol to the dispersion as an aqueous solution at a temperature at or below 49° C.;

reacting the polyvinyl alcohol in between the additions of sizing agent and cationic fixing agent so that the polyvinyl alcohol acts a protective colloid to avoid reactions between the sizing agent and the cationic fixing agent that would produce precipitates; and adjusting the solids content to be at least 30 percent solids.

25. A method for making an ink jet recording medium comprising the steps of:

selecting one or more pigments that when dispersed in water will have a pH of less than 7.0;

forming an aqueous dispersion of one or more pigments, at least 50% by weight of the pigments comprising a non-agglomerated, absorptive silica, a polyvinyl alcohol binder at a ratio of 30–50 parts dry weight per 100 parts of pigment, a sizing agent at a ratio of 1–10 parts by dry weight per 100 parts dry weight of pigment, and a cationic fixing agent at a ratio of 4–10 parts dry weight per 100 parts of pigment;

limiting reactions between the sizing agent and the cationic fixing agent that would produce precipitates;

adjusting the solids content to be at least 30 percent solids;

coating said composition onto at least one side of a substrate; and drying said composition to form the ink jet recording medium.

26. A method for making a coating composition as in claim 25 including cooling the dispersion to a temperature below 49° C. before addition of the sizing agent.

27. A method for making an ink jet recording medium as in claim 25, wherein the step of limiting reactions between the sizing agent and the cationic fixing agent comprises cooling the dispersion to a temperature at or below 49° C. before combining the sizing agent and cationic agent; and reacting the polyvinyl alcohol in between the additions of sizing agent and cationic fixing agent so that the polyvinyl alcohol acts a protective colloid to avoid reactions between the sizing agent and the cationic fixing agent that would produce precipitates.

* * * * *